(12) United States Patent
Manzella et al.

(10) Patent No.: US 10,424,024 B1
(45) Date of Patent: *Sep. 24, 2019

(54) SYSTEM AND METHOD FOR DETERMINING AN INSURANCE PREMIUM BASED ON ANALYSIS OF HUMAN TELEMATIC DATA AND VEHICLE TELEMATIC DATA

(71) Applicant: ALLSTATE INSURANCE COMPANY, Northbrook, IL (US)

(72) Inventors: Matthew James Manzella, Glen Ellyn, IL (US); Alinawaz Ismaili, Skokie, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/974,667

(22) Filed: May 8, 2018

Related U.S. Application Data

(63) Continuation of application No. 14/507,812, filed on Oct. 6, 2014, now Pat. No. 9,984,420, and a continuation of application No. 14/507,789, filed on Oct. 6, 2014, now Pat. No. 9,984,419.

(51) Int. Cl.
*G06Q 40/08* (2012.01)
(52) U.S. Cl.
CPC .................................. *G06Q 40/08* (2013.01)

(58) Field of Classification Search
CPC .................. G06Q 40/08; B60W 40/09; B60W 2040/0818; B60W 2040/0872; G08B 21/06; G08B 21/02
See application file for complete search history.

(56) References Cited

U.S. PATENT DOCUMENTS

| | | | | |
|---|---|---|---|---|
| 7,072,753 B2* | 7/2006 | Eberle | ..................... | B60K 28/02 340/438 |
| 9,031,545 B1* | 5/2015 | Srey | ....................... | H04W 4/046 455/418 |
| 9,081,650 B1* | 7/2015 | Brinkmann | ............ | G07C 5/008 |
| 9,104,535 B1* | 8/2015 | Brinkmann | ........... | B60W 40/09 |
| 9,147,353 B1* | 9/2015 | Slusar | ................... | G09B 19/167 |
| 9,984,419 B1* | 5/2018 | Manzella | ................ | G06Q 40/08 |
| 9,984,420 B1* | 5/2018 | Manzella | ................ | G06Q 40/08 |
| 2008/0146892 A1* | 6/2008 | LeBoeuf | ................. | G16H 50/30 600/300 |
| 2010/0131304 A1* | 5/2010 | Collopy | .............. | G06Q 30/0224 705/4 |
| 2011/0161100 A1* | 6/2011 | Peak | ....................... | G06Q 40/08 705/2 |
| 2012/0004933 A1* | 1/2012 | Foladare | ................. | G06Q 40/00 705/4 |

(Continued)

*Primary Examiner* — Andrew W Bee

(57) ABSTRACT

Systems and methods are disclosed herein for pricing an insurance premium based on telematics data. The system includes a communications interface and a business logic processor in communication with the communications interface. The communications interface receives telematics data collected by a telematics acquisition device. A business logic processor determines an insurance quote for a user based on the received telematics data, vehicle data, and vehicle owner data. The communications interface transmits the insurance quote to the user of the vehicle.

20 Claims, 7 Drawing Sheets

(56) References Cited

U.S. PATENT DOCUMENTS

| | | | |
|---|---|---|---|
| 2012/0036038 A1* | 2/2012 | Farmer | G06Q 20/102 705/26.7 |
| 2012/0072240 A1* | 3/2012 | Grosso | G06Q 40/08 705/4 |
| 2014/0019167 A1* | 1/2014 | Cheng | G06Q 40/08 705/4 |
| 2014/0167967 A1* | 6/2014 | He | B60Q 9/00 340/576 |
| 2014/0172467 A1* | 6/2014 | He | B60K 28/066 705/4 |
| 2014/0257867 A1* | 9/2014 | Gay | G07C 5/00 705/4 |
| 2014/0277902 A1* | 9/2014 | Koch | G07C 5/008 701/29.1 |
| 2014/0300739 A1* | 10/2014 | Mimar | H04N 7/188 348/148 |
| 2015/0025917 A1* | 1/2015 | Stempora | G06Q 40/08 705/4 |
| 2015/0254955 A1* | 9/2015 | Fields | G08B 21/02 705/4 |
| 2015/0351681 A1* | 12/2015 | Lee | A61B 5/4806 600/595 |

* cited by examiner

500

600

700

SYSTEM AND METHOD FOR DETERMINING AN INSURANCE PREMIUM BASED ON ANALYSIS OF HUMAN TELEMATIC DATA AND VEHICLE TELEMATIC DATA

CROSS-REFERENCE TO RELATED APPLICATION

This application is a continuation of U.S. patent application Ser. No. 14/507,789, filed Oct. 6, 2014, and U.S. patent application Ser. No. 14/507,812, filed Oct. 6, 2014 both titled: System and Method for Determining an Insurance premium Based on Analysis of Human Telematic Data and Vehicle Telematic Data.

FIELD OF THE INVENTION

In general, the invention relates to a computerized system and method for determining the price of an insurance premium based on human telematic data and vehicle telematic data.

BACKGROUND

The use of telematics sensors and other location-aware, status-aware devices have begun to make their way into the marketplace. Currently, they are used with vehicles to determine a driver's speed or perhaps location/route traveled. This information is typically used to ensure employees are not deviating from established travel routes or driving in an unsafe fashion. The data received is currently data depicting how or where a person has driven. It is inherently dated or otherwise depicting past events when viewed or analyzed. As the current systems and methods are not set up to provide real time analysis of an individual or their current environment the systems cannot provide a user with information regarding near real time data with regards to driving activity and health status. As a result, current systems are basing insurance premium quotes on outdated data our incomplete data.

As such, what is needed is a system and method that monitors near real time a user and their environment that is capable of providing a more accurate analysis and insurance premium quote.

SUMMARY

A system for processing vehicle safety status data and user data related to determination of an insurance quote for a user. The system includes a communications interface configured to receive health telematics data collected by a telematics data acquisition device. The telematics data acquisition device is configured to collect health telematic data of a user safety status, the health telematic data being indicative of the user safety status health while the user is operating a vehicle. Additionally, the data acquisition device is also configured to receive vehicle telematic data collected by a telematics data acquisition device, wherein the telematics data acquisition device is configured to collect telematics data of a vehicle indicative of vehicle safety. The device provides the health telematic and the vehicle telematic data to a business logic processor for the development of an insurance premium quote based on at least one of the received health telematics data or vehicle telematic data. Further, the system transmits the insurance quote to the user.

A still further aspect includes one or more tangible computer readable media storing computer readable instructions that, when executed, perform a method of providing a insurance quote to a user based upon human health telematic data and vehicle telematic data. Including receiving health telematic data via a communications interface health telematics data collected by a telematics data acquisition device. Also, receiving vehicle telematic data via a communications interface vehicle telematics data collected by a telematics data acquisition device. This includes determining an insurance quote based on the received health telematic data and the received vehicle telematic data. Also included is transmitting the insurance quote to the user.

Yet another non limiting aspect of this disclosure includes a sensor system that has a first sensor, to be worn by a user. The first sensor outputting a first sensor data indicative of measured at least one user health telematic data. Additionally included is a second sensor, in communication with a vehicle being operated by the user, the second sensor outputting a second sensor data indicative of a measured at least one vehicle telematic data. Also, a computing unit, in communication with the first sensor and the second sensor. The computing unit storing program instructions for execution by the computing unit to, receive the first sensor data and the second sensor data, calculate a risk level associated with the first sensor data and the second sensor data, and, output a insurance quote feedback signal to the user indicative of the risk level of the first sensor data and the second sensor data.

Another aspect of the disclosure is a method for providing an insurance quote based upon human health telematic data and vehicle telematic data. The method comprising, receiving, by a communications interface, user health telematics data collected by a telematics data acquisition device. The user health telematics data being indicative of a user health status health while operating a vehicle. Also, receiving, by a communications interface, vehicle telematic data collected by a telematics data acquisition device, the vehicle telematics data being indicative of a vehicle safety status health while being operated by a user. Further, determining, by the business logic processor, an insurance quote for the user based on the received user health telematic data and vehicle telematic data. Additionally, providing by the business logic processor the insurance quote to the communications interface. Also, transmitting, by the communications interface, the insurance quote to the user.

An additional aspect includes a method of providing an insurance premium quote to a user based upon human telematic data and vehicle telematic data. The method includes providing a first sensor to be worn by a user and a first sensor data indicative of measured at least one user health telematic data. Further, the method includes providing a second sensor, in communication with a vehicle being operated by the user, the second sensor outputting a second sensor data indicative of a measured at least one vehicle telematic data. Still further, the method includes providing a computing unit, in communication with the first sensor and the second sensor, the computing unit storing program instructions for execution by the computing unit. The computing unit receives the first sensor data and the second sensor data, calculates a risk level associated with the first sensor data and the second sensor data and, provides an output insurance premium quote indicative of the risk level of first sensor data and the second sensor data to the user.

DETAILED DESCRIPTION

To provide an overall understanding of the invention, certain illustrative embodiments will now be described, including systems and methods for monitoring individual health status, vehicle status, and pricing an insurance premium based on telematics data. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
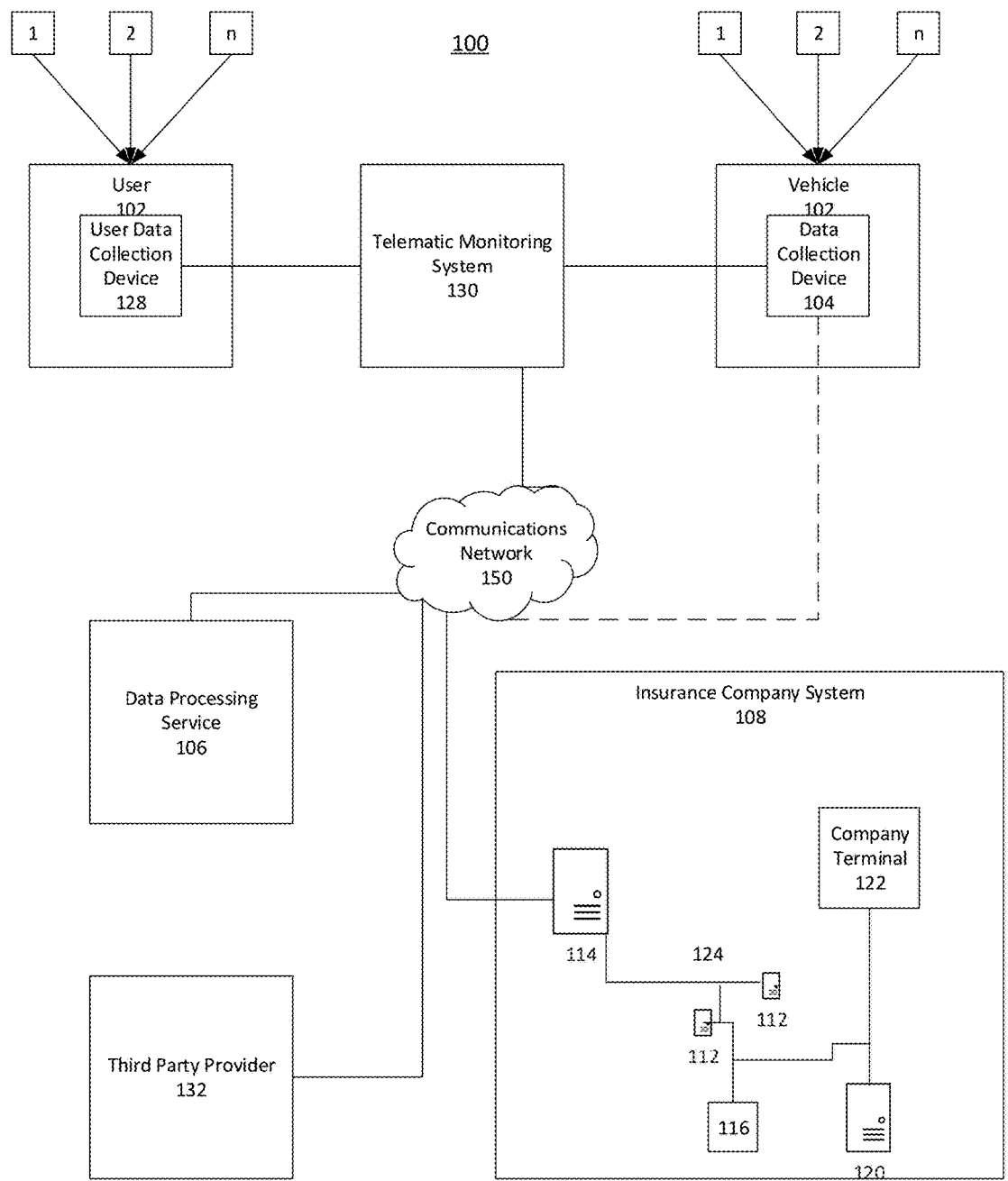
FIG. 1 is an architectural model of a system for quoting vehicle insurance, according to an illustrative embodiment of the invention.

FIG. 1 is a block diagram of a system 100 for monitoring individual health status, vehicle status, and pricing an insurance premium, according to an illustrative embodiment. The system 100 uses telematic data to determine the behavior and safety of a vehicle and its driver. An insurance company uses data related to speed, vehicle handling, driving times, distance traveled, location of the vehicle, and condition of the automobile to assess the behavior and safety of the driver. Additionally, the insurance company uses data related to individual health measurements, and user environmental measurements to further assess the behavior and safety of the driver. With a sufficient amount of data, the insurance company can calculate an insurance premium for the driver based on user health measurements, user environmental measurements, the driving behaviors and the condition of the vehicle. In some implementations, the telematics data is processed or assessed by a third-party data processing service. In addition, the insurance premium price may be set by an underwriter, who may be a part of the insurance company or otherwise affiliated with or in a third-party arrangement with the insurance company.

The system includes a user 110 having at least one user data collection device 128 in communication with the user 110. The user data collection device 128 is configured to measure any variety of user health status measurements such as, without limitation body mass index, blood pressure, respiratory rate, heart rate, body temperature, physical activity rate, eye dialation, blood sugar level, brain function (EEG), vacillations in blood sugar level, hours of sleep, physical activity rate and duration, water consumption, food consumption, alcohol consumption, etc. Suitable exemplary sensing equipment includes wearable devices like Nike's Fuelband™ or a similar activity tracking sensor such as Fitbit™. Likewise, there are a variety of smart clothing options available that include imbedded sensors for health monitoring. Further, wearable EEG sensors are also known, as are blood glucose level sensors, and transdermal sensors for determination of alcohol consumption. Alternatively or additionally, the user data collection device 128 may be configured to sense environmental factors around the user 110. In this manner, it can be determined if the user 110 has entered or is in an unsafe area. Suitable non-limiting examples of such user data collection device 128 include oxygen sensors, carbon monoxide sensors, and methane sensors. All such user data collection device 128 are capable of transmitting data via a network or direct wire.

The system 100 also includes one or more vehicles 102, each having a vehicle data collection device 104. The vehicle 102 may be an automobile, motorcycle, truck, bus, watercraft, aircraft, or any other vehicle operated by a user. A vehicle data collection device 104 is coupled to a vehicle 102 for collecting data about the vehicle's location, movements, or other information that can be used to determine driving behavior and safety. The vehicle data collection device 104 may be positioned inside the vehicle, attached to the outside of the vehicle, or integrated into the vehicle. For vehicles with multiple drivers, the data may be associated with the vehicle itself or with the individual drivers.

In some embodiments, data from the vehicle data collection device 104 is directly transmitted to the insurance company system 108 and/or telematic monitoring system 130 without traveling through the communications network 150. In other embodiments, the vehicle data collection device 104 is in communication with an insurance company system 108 and/or a telematic monitoring system 130 over a communications network 150. The vehicle data collection device 104 may communicate with the insurance company system 108 though a wireless network such as a cellular network or by using a wireless Internet connection.

The vehicle data collection device 104 can be any computing device or plurality of computing devices in cooperation having a data collection sensor (e.g., an antenna or an accelerometer), a processor, a memory, and a means for transmitting the collected data. The customer vehicle 102 or vehicle data collection device 104 may include an antenna for receiving signals from global navigation satellite system (GNSS) satellites, numbered 1 through n in FIG. 1. In some embodiments, the vehicle data collection device 104 is also configured to process the collected data, e.g., by summarizing and/or compressing the data. In some embodiments, the data processing protects the driver's privacy by encrypting the data, removing location information, producing summary information, or taking other measures to reduce the likelihood that location information or other sensitive information are received by the insurance company or third parties. The components of the vehicle data collection device 104 are discussed further in relation to FIG. 3, and an alternative data collection device is described in relation to FIG. 4.

In some embodiments, rather than sending collected data directly to the insurance company system 108, the vehicle data collection device 104 or the telematic monitoring system 130 sends collected data to a data processing service 106, which processes the data to determine user safety, vehicle safety and driving behavior information that is then sent to the insurance company system 108 for setting an insurance premium price. This can help protect a driver's privacy, since the insurance company does not receive detailed data about a driver's location, but only receives summary information, e.g., a driving behavior rating or score. Using a data processing service 106 in some implementations also preferable to having either the user data collection device 128 or the vehicle data collection device 104 process data because it reduces the processing power needed by the respective collection device 128,104 and because using a third-party data processing service 106 may also make it more difficult to tamper with the data. The data processing service can perform additional monitoring functions, such as vehicle security monitoring or providing location-based alerts (e.g., alerting a parent or employer when a vehicle goes outside of a specified range) and/or speed alerts. Additionally, or to the contrary, if a potentially dangerous condition is determined, warning messages may be sent to the user 110.

The insurance company system 108 includes a plurality of application servers 112, a plurality of load balancing proxy servers 114, an insurance company database 116, a processing unit 120, and company terminal 122. These computing devices are connected by a local area network 124.

The application servers 112 are responsible for interacting with the user data collection device 128, the vehicle data collection device 104, and/or the data processing service 106. The data exchange between the insurance company system 108 and telematic monitoring system 130, user data collection device 128, vehicle data collection device 104, and/or data processing service 106 can utilize push and pull technologies where the application servers 112 of the insurance company system 108 can act as both a server and client for pushing data to the telematic monitoring system 130, user data collection device 128, vehicle data collection device 104, and/or data processing service 106 (e.g., which vehicles to monitor, when to stop data collection, rules for monitoring services requested by the customer) and for pulling data from the telematic monitoring system 130, user data collection device 128, vehicle data collection device 104, and/or data processing service 106. The application servers 112 or other servers of the insurance company system 108 can request to receive periodic data feeds from the telematic monitoring system 130, user data collection device 128, the vehicle data collection device 104, or data processing service 106. The communication between the application servers 112 and the telematic monitoring system 130, user data collection device 128, vehicle data collection device 104, and/or data processing service 106 can follow various known communication protocols, such as TCP/IP. Alternatively, the application servers 112 and telematic monitoring system 130, vehicle data collection device 104, and/or data processing service 106 can communicate with each other wirelessly, e.g., via cellular communication, Wi-Fi, Wi-Max, or other wireless communications technologies or combination of wired or wireless channels. The load balancing proxy servers 114 operate to distribute the load among application servers 112.

The insurance company database 116 stores information about vehicular insurance policies. For each insurance policy, the database 116 includes for example and without limitation, the following data fields: policy coverage, policy limits, deductibles, the agent responsible for the sale or renewal, the date of purchase, dates of subsequent renewals, product and price of product sold, applicable automation services (for example, electronic billing, automatic electronic funds transfers, centralized customer service plan selections, etc.), customer information, customer driving behavior, customer payment history, or derivations thereof.

The processing unit 120 is configured for determining the price of an insurance premium based on driving behavior and other information related to the driver and the vehicle.

The processing unit 120 may comprise multiple separate processors, such as a driving behavior processor, which analyzes driving behavior from raw or processed data received from the telematic monitoring system 130, user data collection device 128, vehicle data collection device 104, and/or data processing service 106 over the communications network 150; and a business logic processor, which determines a premium price for a policyholder based on, among other things, user health state, user environment state and the driving behavior. In some embodiments, insurance premium prices or information for making insurance pricing determinations may be generated by a third-party underwriter, which is separate from the insurance company system 108. An exemplary implementation of a computing device for use in the processing unit 120 is discussed in greater detail in relation to FIG. 2.

The company terminals 122 provide various user interfaces to insurance company employees to interact with the processing system 120. The interfaces include, without limitation, interfaces to review driving behavior data; to review vehicle data; to review customer or potential customer measured health data; to retrieve data related to insurance policies; to manually adjust driving behavior ratings; and to manually adjust premium pricing. In some instances, different users may be given different access privileges. For example, marketing employees may only be able to retrieve information on insurance policies but not make any changes to data. Such interfaces may be integrated into one or more websites for managing the insurance company system 108 presented by the application servers 112, or they may be integrated into thin or thick software clients or stand alone software. The company terminals 122 can be any computing devices suitable for carrying out the processes described above, including personal computers, laptop computers, tablet computers, smartphones, servers, and other computing devices.

User terminals can provides various user interfaces to customers to interact with the insurance company system 108 over the communications network 150. Customers may also use their personal computers, smartphones, tablet computers, or other computing devices as terminals for accessing user interfaces provided by the insurance company. For example, customers can access a web page or application provided by the insurance company to enter information pertaining to changes in their insurance policy, e.g., changes in policy coverage, addition or subtraction of drivers, addition or subtraction of vehicles, relocation, mileage information, addition or subtraction of various user sensors 128, etc.

In some embodiments, the user data collection device 128 and the vehicle data collection device 104 are not continually connected to the insurance company system 108 via the network 150. For example, the various collection devices 128, 104 may be configured to temporarily store data if they become disconnected from the network, like when it travels out of range of cellular towers. When the connection is restored, the user data collection device 128 and/or data collection device 104 can then transmit the temporarily stored data to the insurance company system 108. The user data collection device 128 and/or vehicle data collection device 104 may alternatively be configured to connect to the communications network 150 through a user's home Wi-Fi network. In this case, the user data collection device 128 and/or vehicle data collection device 104 stores all sensed data until it returns to the vicinity of the user's home, connects to the user's wireless network, and sends the data.

In some embodiments, data from a third-party data provider 132 is accessed by one or more of the vehicle data collection device 104, user data collection device 128, the data processing service 106, the insurance company system 108, and or/the telematic monitoring system 130 over the communications network 150. Data from a third-party data provider 132 can be used in calculating an insurance premium. For example, the third-party data provider 132 can provide traffic or weather data that is processed in conjunction with the received telematics data to evaluate driving patterns in view of the road conditions. Other third-party data providers 132 provide data related to a customer or a potential customer, such as the customer's driving record or credit history.

Figure 2:
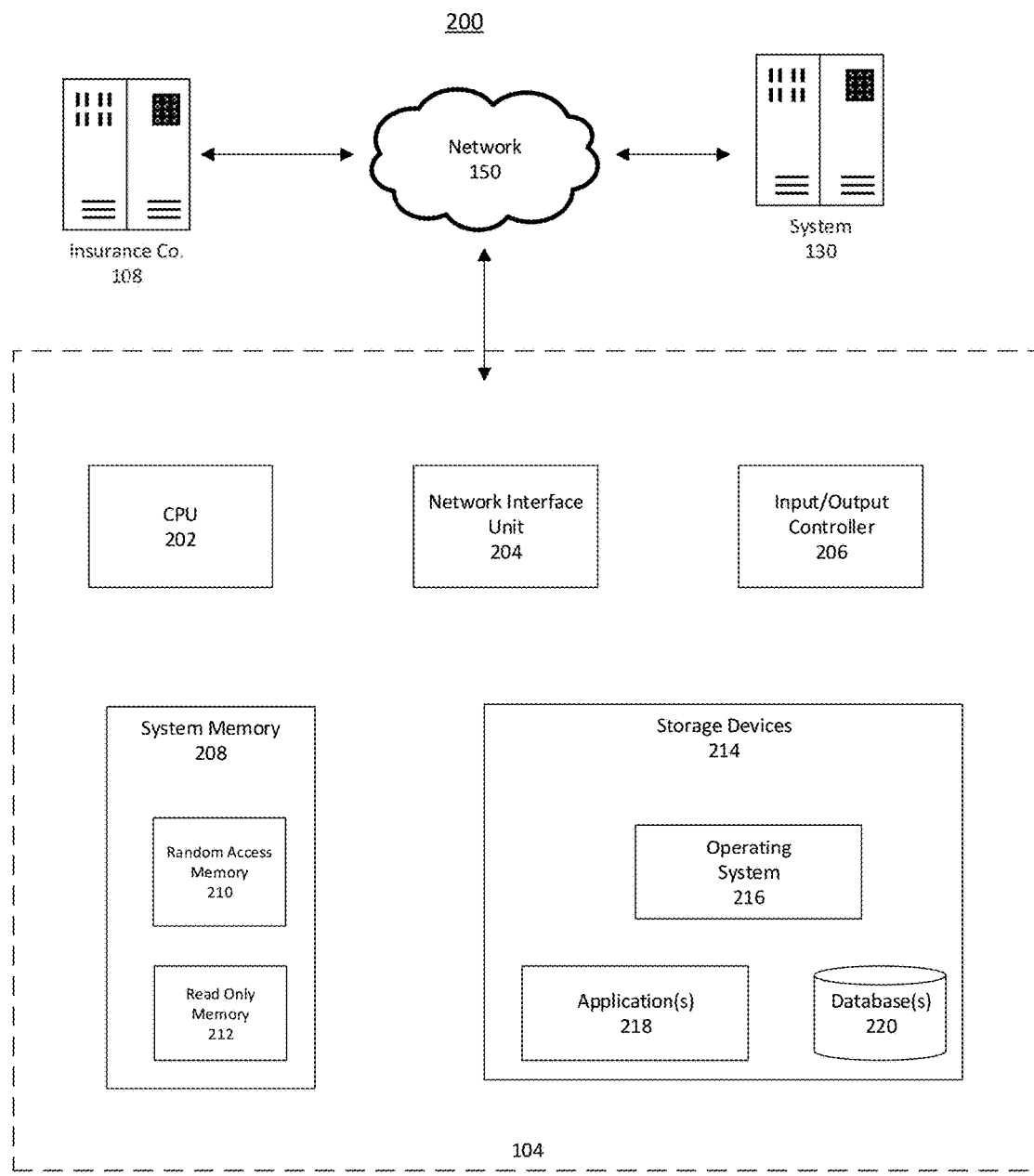
FIG. 2 is a block diagram of a computing system as used in FIG. 1, according to an illustrative embodiment of the invention.

FIG. 2 is a block diagram of a computing device 200 used for carrying out at least one of driving health and/or behavior processing and business logic processing described in relation to FIG. 1, according to an illustrative embodiment of the invention. The computing device comprises at least one network interface unit 204, an input/output controller 206, system memory 208, and one or more data storage devices 214. The system memory 208 includes at least one random access memory (RAM) 210 and at least one read-only memory (ROM) 212. All of these elements are in communication with a central processing unit (CPU) 202 to facilitate the operation of the computing device 200. The computing device 200 may be configured in many different ways. For example, the computing device 200 may be a conventional standalone computer or alternatively, the functions of computing device 200 may be distributed across multiple computer systems and architectures. The computing device 200 may be configured to perform some or all of the driving behavior and business logic processing, or these functions may be distributed across multiple computer systems and architectures. In the embodiment shown in FIG. 1, the computing device 200 is linked, via network 150 or local network 124 (also described in FIG. 1), to other servers or systems housed by the insurance company system 108, such as the load balancing server 114, and the application servers 112, and to the telematic monitoring system 130.

The computing device 200 may be configured in a distributed architecture, wherein databases and processors are housed in separate units or locations. The computing device 200 may also be implemented as a server located either on site near the insurance company system 108, or it may be accessed remotely by the insurance company system 108. Some such units perform primary processing functions and contain at a minimum a general controller or a processor 202 and a system memory 208. In such an embodiment, each of these units is attached via the network interface unit 204 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 202 comprises a processor, such as one or more conventional microprocessors and one or more supplementary co-processors such as math co-processors for offloading workload from the CPU 202. The CPU 202 is in communication with the network interface unit 204 and the input/output controller 206, through which the CPU 202 communicates with other devices such as other servers, user terminals, or devices. The network interface unit 204 and/or the input/output controller 206 may include multiple communication channels for simultaneous communication with, for example, other processors, servers or client terminals.

Devices in communication with each other need not be continually transmitting to each other. On the contrary, such devices need only transmit to each other as necessary, may actually refrain from exchanging data most of the time, and may require several steps to be performed to establish a communication link between the devices.

The CPU 202 is also in communication with the data storage device 214. The data storage device 214 may comprise an appropriate combination of magnetic, optical and/or semiconductor memory, and may include, for example, RAM, ROM, flash drive, an optical disc such as a compact disc and/or a hard disk or drive. The CPU 202 and the data storage device 214 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 202 may be connected to the data storage device 214 via the network interface unit 204.

The CPU 202 may be configured to perform one or more particular processing functions. For example, the computing device 200 may be configured for calculating ratings related to driving behavior. The same computing device 200 or another similar computing device may be configured for calculating an insurance premium for a vehicle based at least upon one driving behavior.

The data storage device 214 may store, for example, (i) an operating system 216 for the computing device 200; (ii) one or more applications 218 (e.g., computer program code and/or a computer program product) adapted to direct the CPU 202 in accordance with the present invention, and particularly in accordance with the processes described in detail with regard to the CPU 202; and/or (iii) database(s) 220 adapted to store information that may be utilized to store information required by the program. The database(s) 220 may include all or a subset of data stored in insurance company database 116, described above with respect to FIG. 1, as well as additional data, such as formulas or manual adjustments, used in establishing the insurance risk for a vehicle.

The operating system 216 and/or applications 218 may be stored, for example, in a compressed, an uncompiled and/or an encrypted format, and may include computer program code. The instructions of the program may be read into a main memory of the processor from a computer-readable medium other than the data storage device 214, such as from the ROM 212 or from the RAM 210. While execution of sequences of instructions in the program causes the CPU 202 to perform the process steps described herein, hard-wired circuitry may be used in place of, or in combination with, software instructions for implementation of the processes of the present invention. Thus, embodiments of the present invention are not limited to any specific combination of hardware and software.

Figure 5:
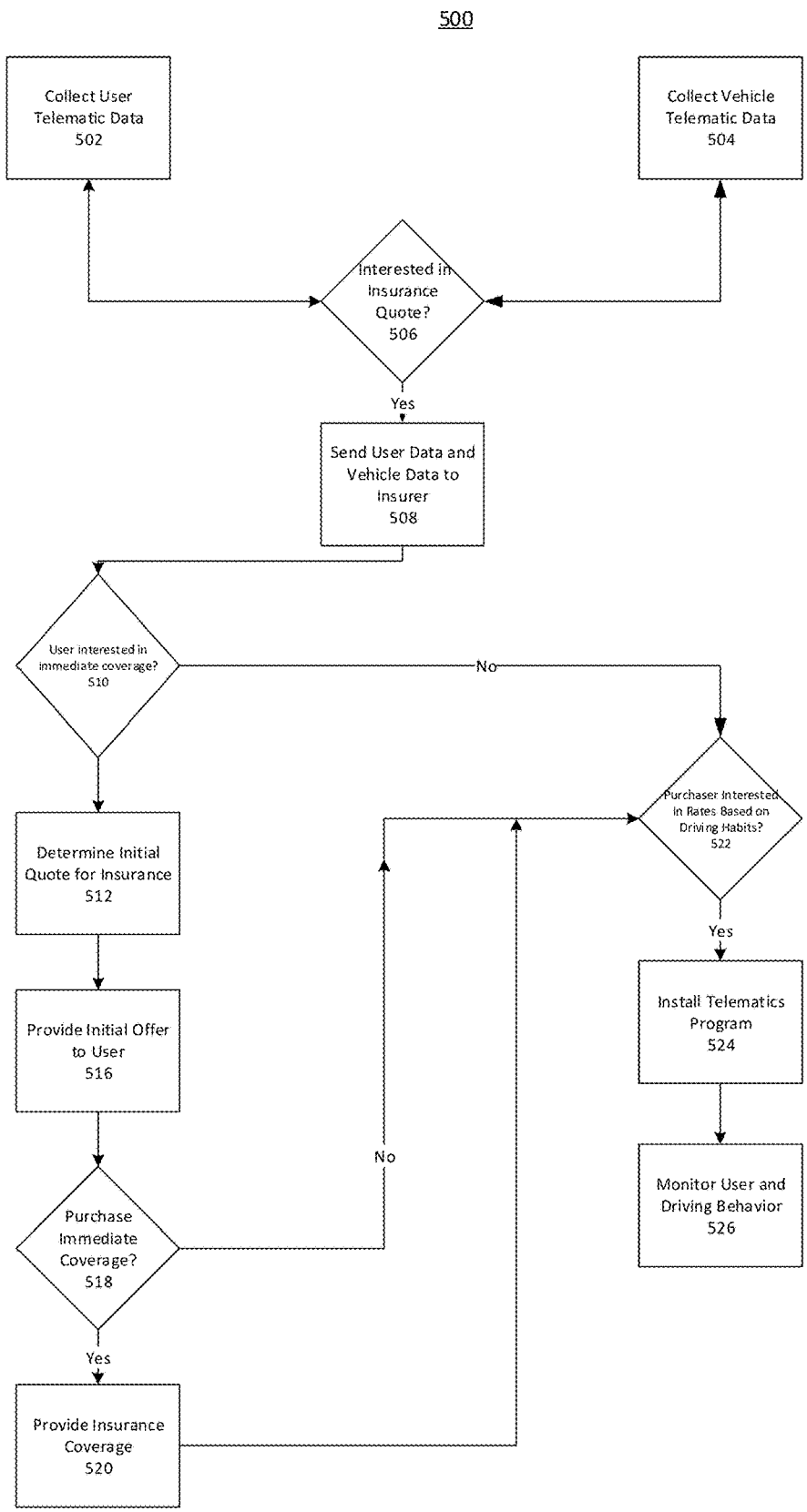
FIG. 5 is a flowchart of a method for determining an insurance quote based on telematics data, according to an illustrative embodiment of the invention.
Figure 6:
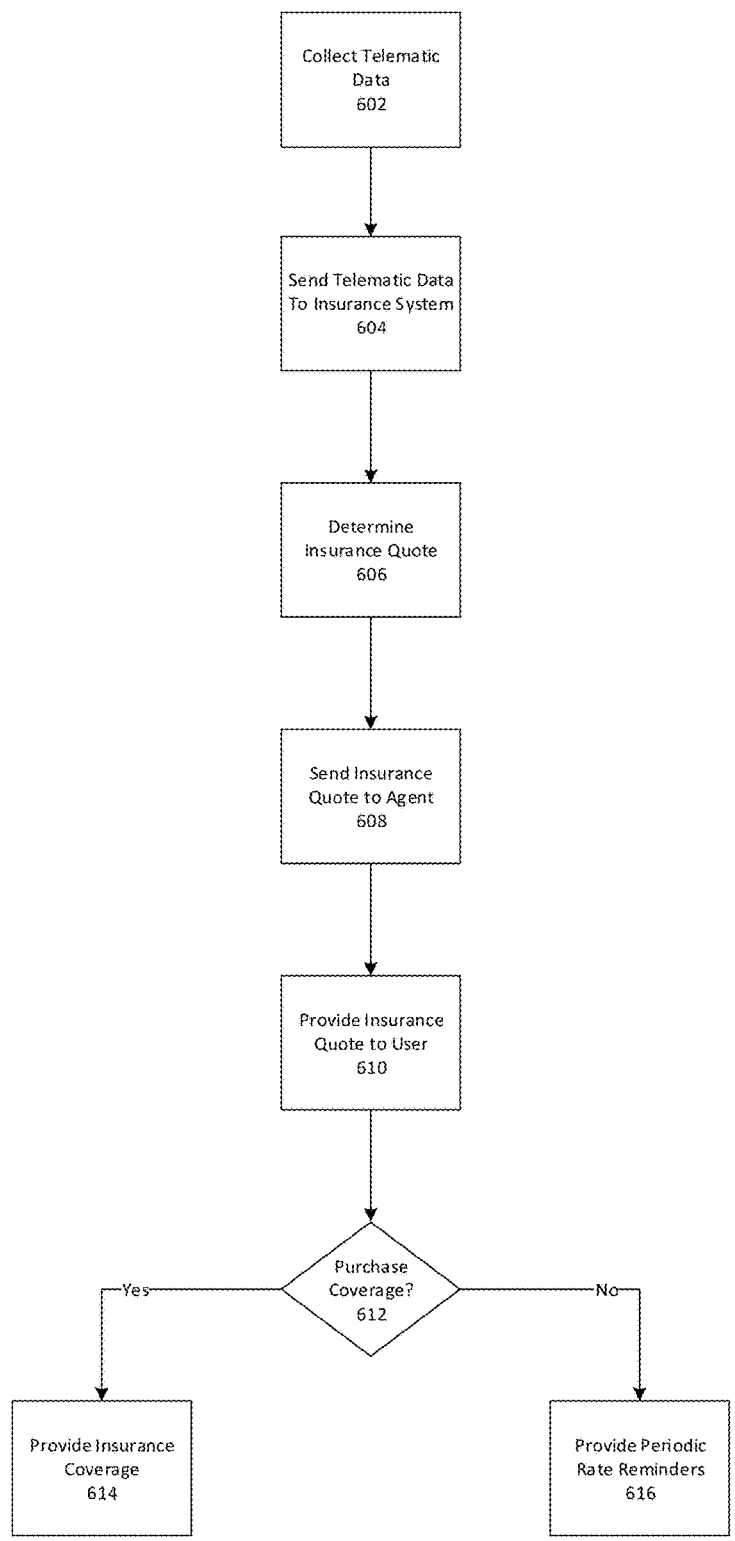
FIG. 6 is a flowchart of a method for determining an insurance quote based on telematics data, according to an illustrative embodiment of the invention.
Figure 7:
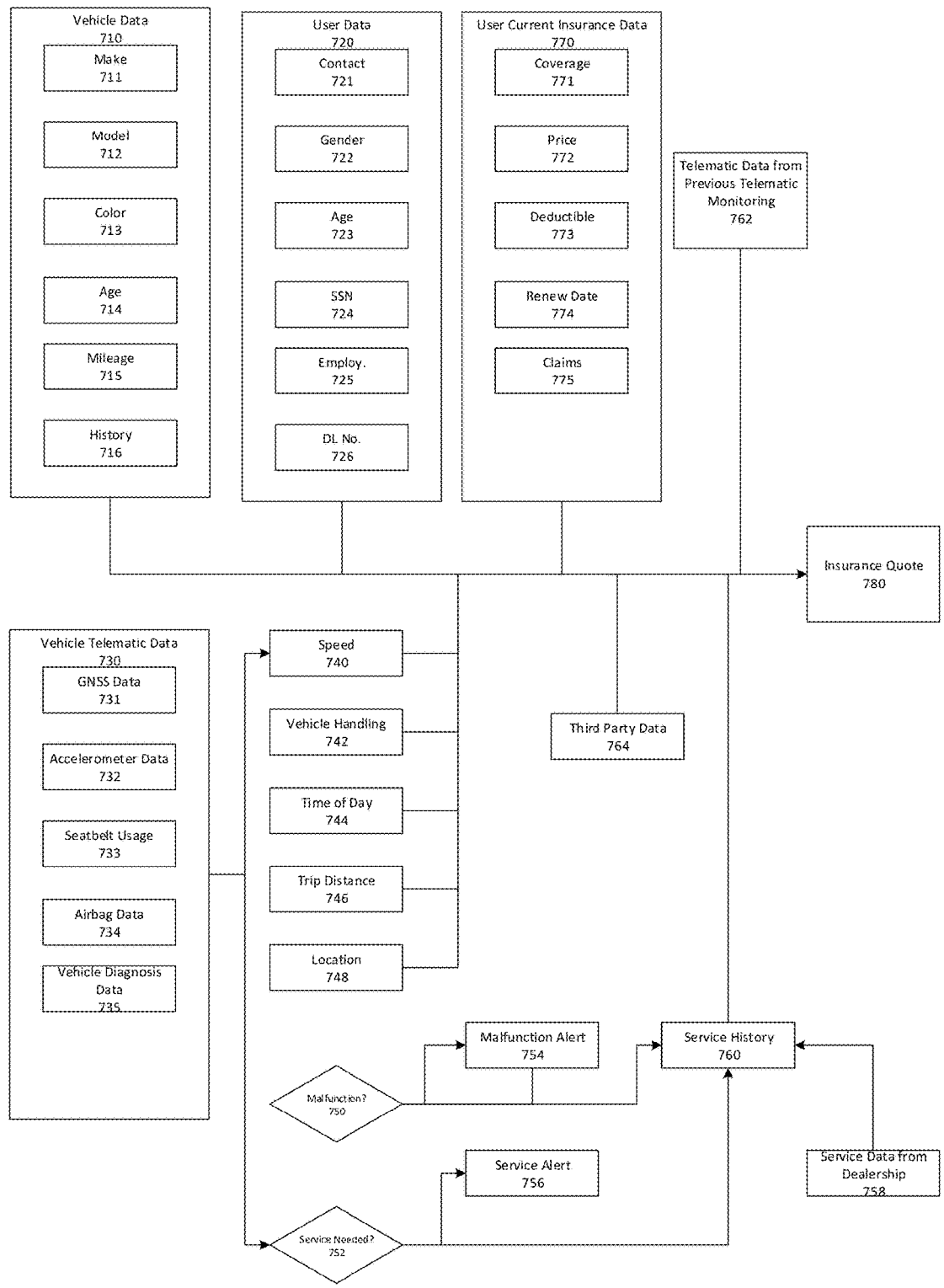
FIG. 7 is a data flow diagram illustrating a method for computing an insurance premium quote based on telematics data, vehicle data, user data, user telematic data, and service data, according to an illustrative embodiment of the invention.

Suitable computer program code may be provided for analyzing driving behavior and determining an insurance premium price as described in relation to FIGS. 5 through 7. The program also may include program elements such as an operating system, a database management system and "device drivers" that allow the processor to interface with computer peripheral devices (e.g., a video display, a keyboard, a computer mouse, etc.) via the input/output controller 206.

The term "computer-readable medium" as used herein refers to any non-transitory medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 202 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 3:
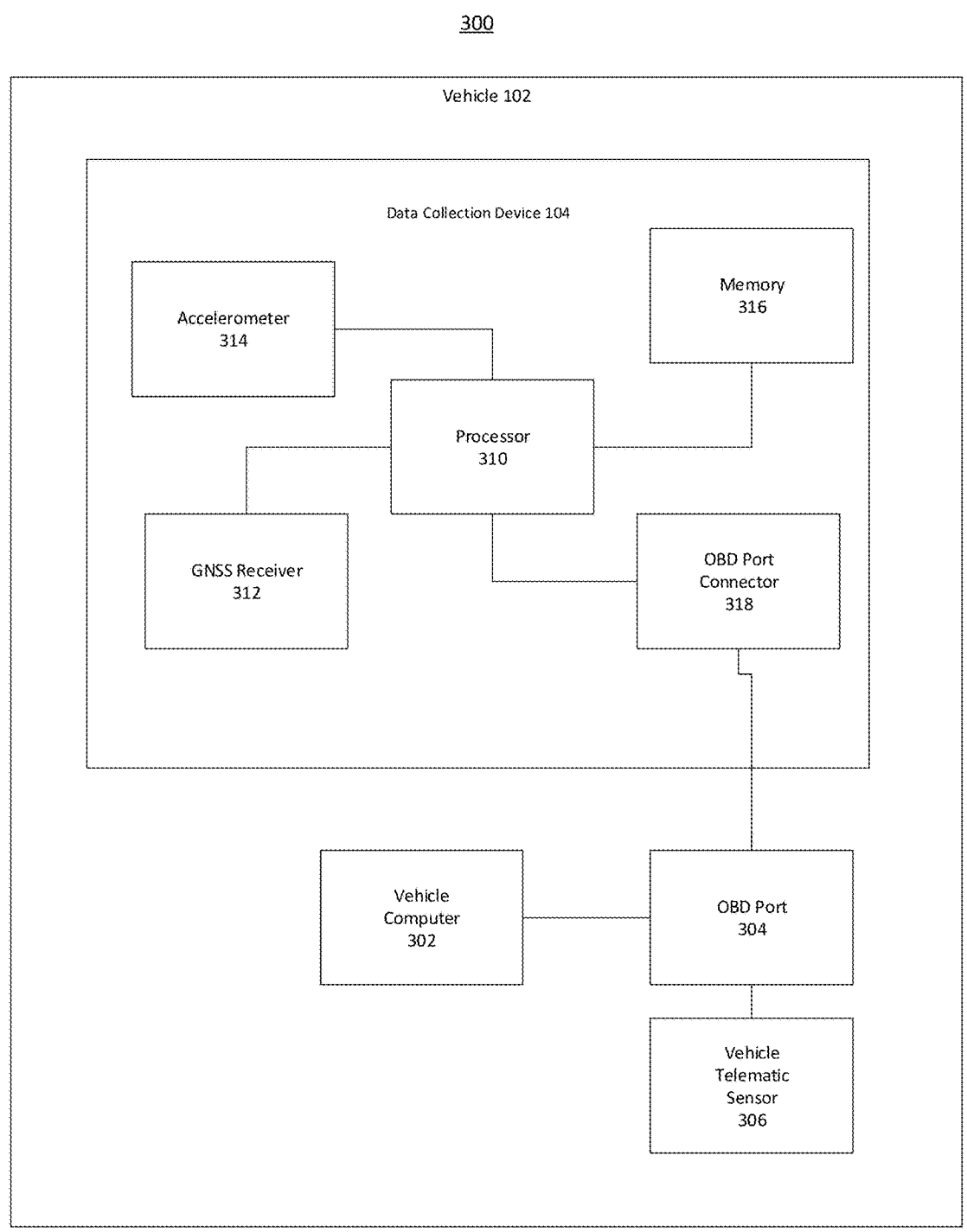
FIG. 3 is a block diagram of a device coupled with a vehicle for collecting data used for pricing insurance, according to an illustrative embodiment of the invention.

FIG. 3 is a block diagram 300 of a vehicle 102 having a vehicle data collection device 104. As described in relation to FIG. 1, the vehicle 102 may be an automobile, motorcycle, truck, bus, watercraft, aircraft, or any other vehicle operated by a driver. The vehicle 102 includes a vehicle computer 302, an on-board diagnostics (OBD) port 304, and vehicle telematics sensors 306. The vehicle data collection device 104 is connected to the vehicle 102 via an OBD port connector 318 connected to the OBD port 304 to receive telematics data and other information. The vehicle data collection device 104 includes a processor 310, a GNSS receiver 312, an accelerometer 314, and memory 316. The processor 310 can be a CPU, a microprocessor, an FPGA, or any other processing unit that can be configured to execute a software or firmware program for telematics data acquisition. The processor 310 is in communication with the other elements of the vehicle data collection device 104 to facilitate the operations of the vehicle data collection device 104. The processor can also be configured to process data received from the GNSS receiver 312, the accelerometer 314, and the OBD port connector 318. Data processing may include analyzing driving behavior, determining if service is needed, determining if there is a malfunction with the vehicle, formatting data, or encrypting data.

The GNSS receiver 312 includes an antenna and associated signal processing circuitry for receiving signals from global navigation satellite system (GNSS) satellites, such as the satellites numbered 1 through n in FIG. 1, and determining its location from the signals. GNSS satellites may be, for example, GPS, GLONASS, Galileo, or Beidou satellites which send time and orbital data from which the vehicle data collection device 104 can calculate its location. In some configurations, the processor 310 calculates the location of the vehicle from data from the receiver 312. The processor 310 can pull location data from the GNSS receiver 312 at set time intervals, such as every 0.1 seconds, 0.2 seconds, 0.5 seconds, 1 second, 2 seconds, 5 seconds, or 10 seconds. The processor 310 sends the location data to the memory 316 along with a time and date stamp indicating when the vehicle was at the location. In some embodiments, the GNSS receiver 312 may be part of a separate GNSS device used by the driver for obtaining driving directions. In this case, the GNSS receiver 312 transmits data to the vehicle data collection device 104 though a wired connection or a wireless connection, e.g., BLUETOOTH or Wi-Fi.

The accelerometer 314 is a device that measures proper acceleration. Data collected from an accelerometer 314 may include or be used for obtaining the g-force, acceleration, orientation, shock, vibration, jerk, velocity, speed, and/or position of the vehicle. Some or all of these types of data are received or calculated by the processor 310. The processor 310 may collect data at intervals such as every 0.1 seconds, 0.2 seconds, 0.5 seconds, 1 second, 2 seconds, 5 seconds, or 10 seconds and store the data in the memory 316. Each data point is time and date stamped and/or location stamped. In some embodiments, the processor 310 determines intervals between data stored in the memory 316 based on trends in the data. The rate of data collection may vary based on the route being driven; for example, if a driver is travelling along a straight road at a consistent speed, the processor 310 may save data less frequently than if the driver is making frequent turns. In some embodiments, only "exception data" evident of safety events or other unusual driving behavior is stored. For example, the processor 310 may only save accelerations, decelerations, hard turns, speeds, lane change speeds, etc. with rates above a certain threshold.

The OBD port connector 318 is used to collect data from the vehicle computer 302 and/or vehicle telematics sensors 306 via OBD port 304. The OBD port 304 can have a standard interface, such as OBD-I, OBD-1.5, OBD-II, EOBD, EOBD2, JOBD, ADR 79/01, or ADR 79/02. While OBD ports are often found in automobiles, some automobiles and other classes of vehicles may use different types of diagnostic ports. In non-automobile applications, instead of an OBD port 304, any other port and corresponding connector for receiving data from a vehicle's computer can be used. The vehicle computer 302 may provide information about the vehicle's speed, the number of miles traveled, whether the vehicle is running or not, seatbelt usage, airbag deployment, and vehicle diagnostics. Vehicle diagnostics data can be used to determine the presence of any vehicle malfunctions, such as low tire pressure, low oil pressure, high engine temperature, loss of power, and stalling. With the vehicle diagnostics data, it is possible to determine whether a safety event was caused by the driver's actions or related to the malfunction, and thus not reflective of the driver's driving habits. The vehicle may contain additional telematics sensors 306 for, e.g., vehicle tracking, monitoring gasoline consumption, and vehicle safety. Data obtained by the vehicle data collection device 104 from the vehicle computer 302 and telematics sensors 306 via the OBD port 304 can supplement or be used instead of data collected by the GNSS receiver 312 and/or accelerometer 314. In some embodiments, the vehicle data collection device 104 turns on automatically when the vehicle 102 is turned on, and the vehicle 102 may power the vehicle data collection device 104. In some embodiments, the vehicle data collection device 104 is installed elsewhere in the vehicle, such as under a seat, in the steering wheel, in the safety belt, in the mirrors or, if the vehicle is an automobile, under the hood, in the glove box, or in another storage area. In such embodiments, the vehicle data collection device 104 may or may not be connected to the OBD port 304. For example, the vehicle data collection device 104 can be hardwired directly to the vehicle computer 302.

In some embodiments, the user data collection device 128 and/or the vehicle data collection device 104 may also be configured to communicate with the driver or a passenger via an external user interface, such as a display screen on the dashboard of the vehicle 102. The external user interface includes output components, such as a screen or speakers, and may include input components, such as a touch screen, keyboard, or microphone. The external user interface can output driving behavior data, vehicle diagnostics data, a service alert, a malfunction alert, and any data collected from the GNSS receiver 312, accelerometer 314, and/or OBD port 304. In some embodiments, the vehicle data collection device 104 is also a navigation device that can calculate and display a route to a destination inputted by the user.

In some embodiments, rather than running the data acquisition program on a dedicated data acquisition device installed in the vehicle, the data acquisition program runs on the user's mobile device, such as an IPHONE™, BLACK-BERRY™, or any other smartphone or mobile computing device configured to collect data that can be used to analyze driving behavior. The data can be collected using sensors, such as a GNSS receiver or accelerometers, in the mobile device, or the data can be transmitted from the vehicle and received by the mobile device via a wired or wireless connection.

Figure 4:
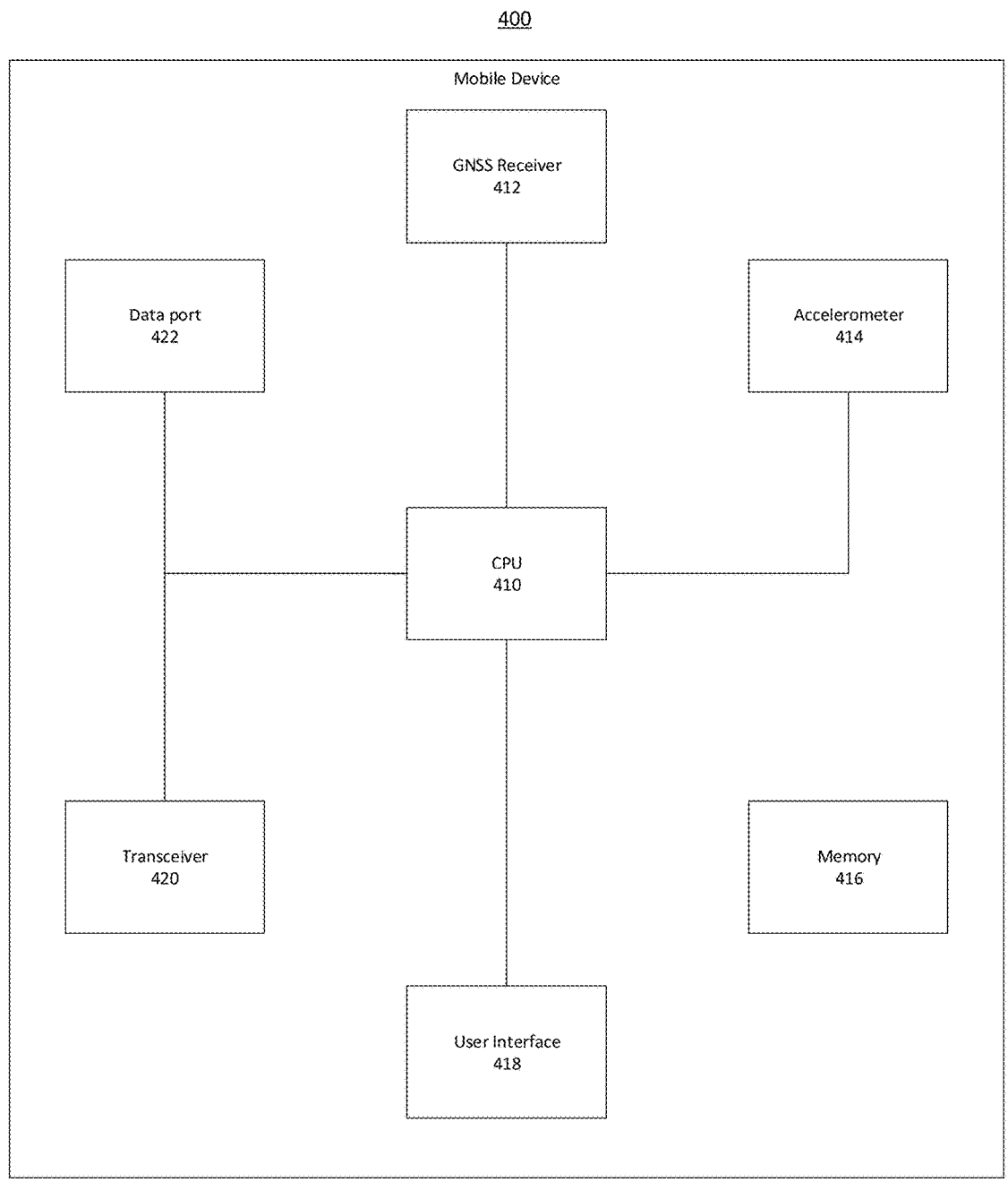
FIG. 4 is a block diagram of a mobile device used within a vehicle for collecting data used for pricing insurance, according to an illustrative embodiment of the invention.

FIG. 4 is a block diagram of an exemplary mobile device 400 that can be used instead of the vehicle data collection device 104. The mobile device 400 includes a CPU 410, a GNSS receiver 412, an accelerometer 414, and a memory 416, which are similar to the processor 310, the GNSS receiver 312, the accelerometer 314, and the memory 316, respectively, described above in relation to FIG. 3. The mobile device 400 also includes a user interface 418, a transceiver 420, and a dataport 422. The CPU 410 is configured to execute a software application for telematics data acquisition. The CPU 410 is in communication with all of the other elements of the mobile device 400 to facilitate the operation of the data collection device 400, and can perform processing similar to the processing performed by the processor 310 described above in relation to FIG. 3.

A user 110 of the mobile device interacts with the mobile device through the user interface 418. The user interface 418 can include one or more of a screen, a touch screen, a speaker, a headphone jack, a keyboard, and a microphone. One or more transceivers 420 are used to connect to and exchange data over a cellular network, the Internet, a BLU-ETOOTH™ connection, or other wireless communications pathways. The dataport 422 is used for wired communication with the vehicle and/or the telematic monitoring system 130. The data acquisition application can be downloaded from the network or the telematic monitoring system 130 either wirelessly using the transceiver 420 or through a wired connection using the dataport 422. Once the data acquisition application has been installed, it should be executed each time the user 110 drives the vehicle. The driver can use the user interface 418 to execute the data acquisition application each time he drives the vehicle. In some embodiments, the mobile device 400 can automatically execute the data acquisition application when the mobile device 400 determines that it is in a vehicle based on the speed determined by processing the signals from the GNSS receivers 412 and/or accelerometers 414, the location based determined by processing the signals from the GNSS receivers 412, and/or other methods.

In some embodiments, the mobile device 400 is connected to the vehicle by a wireless connection (e.g., BLU-ETOOTH) or a wired connection using the transceiver 420 or the dataport 422, respectively. In such embodiments, the mobile device 400 can be configured to automatically execute the data acquisition application based on the presence of the vehicle connection. While the vehicle is being driven, the vehicle's computer can send telematics data to the mobile device 400. If the mobile device 400 receives data indicating a vehicle malfunction or the need for the vehicle to be serviced, the CPU 410 can create an alert or service reminder, and the alert or service reminder can be communicated to the driver via the user interface 418. Telematics data received from the vehicle and/or detected by the GNSS receivers 412 or accelerometers 414 is stored in memory 416. The telematics data can be sent to the telematic monitoring system 130, vehicle data collection device 104, and/or data processing service 106 in real time, near-real time, or after a longer period of data collection via the transceiver 420, or the data can be transmitted after a period of data collection via the data port 422.

FIG. 5 is a flowchart of a method for providing a vehicle insurance quote using the systems described in relation to FIGS. 1 through 4. The method involves collecting data from the user 110 and vehicle 102 (steps 502 and 504), determining the user's interest in insurance (decision 506), offering temporary coverage (steps 508 through 520), and installing a telematics program to monitor driving behavior (steps 522 through 526).

An insurance company collects user telematic data, such as the user's name, address, driver's license number, contact information, payment information, and current insurance information (step 502). Likewise, vehicle telematic data is gathered as well (step 504). A decision regarding a user's interest in obtaining insurance is made (decision 506). If interested, user and vehicle telematic data is sent to the insurer (step 508). The types of data transmitted to the insurer for generating a premium price are discussed in greater detail in relation to FIG. 7.

A determination is made whether the user is interested in immediate insurance coverage (decision 510). The user may be interested in immediate coverage if, for example, the purchaser does not currently have an insurance plan or if the purchaser is unsatisfied with his current insurance plan and would like to switch immediately. If the purchaser is interested in immediate coverage, the insurance system 108 determines an initial quote for vehicle insurance based on the user information and vehicle information (step 512). In some embodiments, the insurance system 108 can set this quote to be relatively low to encourage the purchaser to buy the insurance initially. In other embodiments, the insurance system 108 can set the quote relatively high so that if the purchaser receives a long-term rate based on safe driving behavior, the purchaser is encouraged to buy the insurance since the long-term price is a lower price than the price they have been paying. The insurance system 108 can use any strategy or calculation for determining the price of the initial quote.

The insurance system 108 sends this initial quote to the user (step 514), and the dealer provides the initial offer to the purchaser (step 516). A decision from the user is made of whether or not he wants to purchase immediate coverage (decision 518). If the purchaser decides to purchase immediate coverage, the insurer processes the billing of the purchaser for the insurance and instructs the insurance system 108 to immediately begin coverage of the user (step 520).

Whether or not the user 110 decided to purchase immediate coverage, the insurer will determine whether the user is interested in receiving a quote for insurance based on the user's driving habits (decision 522). Even if the user was not interested in immediate coverage (decision 510), the insurer will still determine whether the user is interested in receiving a quote for insurance based on the user's driving habits (decision 522). If the user is interested in receiving an insurance quote based on his driving habits, the insurer configures a telematics data acquisition device, for example, by installing the vehicle data collection device 104 described in relation to FIG. 3 that executes the telematics data acquisition program, by installing the telematics data acquisition program for execution on the mobile device 400 described in relation to FIG. 4 (step 524). In other embodiments, the telematics data acquisition program is installed as a program or an add-on to a computing device already in the vehicle (e.g., an ON-STAR unit). Once the telematics data acquisition program is installed in the vehicle or on a device, the telematics data acquisition program monitors the driving behavior (step 526).

FIG. 6 describes a method for determining an insurance rate for a driver based on telematics data once the telematics data acquisition program has been installed. The telematics data acquisition program on the vehicle data collection device 104 or mobile device 400 collects data related to the user's driving behavior and the condition of the vehicle, as described in relation to FIGS. 3 and 4 (step 602), during a data acquisition period or monitoring period. The driving can be monitored for any period of time or driving distance over which a sufficient amount of data to analyze the user's driving behavior can be collected, e.g., 1 month, 2 months, 3 months, or 6 months, or 500 miles, 1000 miles, 2000 miles, 3000 miles, or 5000 miles.

As the data is being collected or after the data has been collected, the vehicle data collection device 104 or mobile device 400 transmits the data to the insurance system 108 (step 604). As previously mentioned, the data may be processed by the telematic monitoring system 130 and/or a third-party data processing service 106 before being sent to the insurance system 108. The insurance system 108 then determines a quote for the vehicle insurance (step 606) based on the received telematics data as well as data related to the vehicle and the user 110. Determining the quote for vehicle insurance is described in further detail in relation to FIG. 7.

Once the quote has been determined, the insurance system 108 transmits the insurance quote to the user 110 for his consideration (step 610). The quote may include several possible types of coverage at different prices from which the user 110 can choose. If the dealer cannot provide the quote to the user 110 in person, the dealer or the insurance company can contact the user 110 and provide the quote by telephone, mail, electronic mail, or any other communications means.

The user 110 then determines whether to purchase coverage at the offered price (step 612). If the user 110 agrees to purchase insurance coverage based on the quote, the insurance company provides coverage and proof of insurance to the user 110 (step 614). If the user 110 declines coverage, the insurance company may provide periodic reminders about the rate and any promotions available (step 616). If the user 110 declined the insurance because his health status or driving behavior drove the price too high, the user 110 may be given the option to improve his health and/or driving behavior with continued monitoring. In this case, if the user 110 later decides to purchase insurance because his health and/or driving improved and his rate was reduced, the insurance company may request that the user 110 is continually monitored to ensure that the user 110 continues driving safely. If the user 110 declined the insurance for other reasons, he can still agree to continual monitoring in return for various incentives, including, for example, a continued agreement to pay for the user's deductible if needed. The insurance company can continue to provide updated insurance quotes, e.g., on the receipts for services received. This also provides additional telematics data for the insurance company to use in generating quotes for the user 110 and other prospective customers.

FIG. 7 provides greater detail into the factors involved in developing an insurance quote. The insurance quote is derived from four main classes of data: vehicle data 710, user data 720, user current insurance data 770, and vehicle telematic data 730. The vehicle telematics data 730 is processed to generate data related to driving behavior and vehicle condition. Based on the vehicle condition, a malfunction alert or service alert may be provided to the user 110. In addition to the vehicle data 710, user data 720, user current insurance data 770, and vehicle telematics data 730, data from previous telematics monitoring 762 and service history data 760 can be used to determine the insurance quote 780. The processing steps for processing the data described in relation to FIG. 7 and calculating insurance rates can be performed at the insurance system 108, the third-party data processing service 106, the telematic monitoring system 130, the vehicle data collection device 104 or mobile device 400, or any combination of these systems and devices.

Vehicle data 710 is comprised of data relating to the vehicle. The vehicle data 710 includes the make or brand of the vehicle sold 711, the model of the vehicle sold 712, and the color of the vehicle sold 713. If the vehicle has different submodels or options available, this data is also included in the vehicle data 710. For a used vehicle, the vehicle data 710 also includes the age of the vehicle 714, the mileage of the vehicle 715, and the history of the vehicle 716. The history 716 includes information on any events such as accidents or malfunctions experienced prior to purchase. The history 716 also includes any available service records and any available information related to how and where the car was driven by its previous owner(s). The vehicle data may also include the purchase price and/or Blue Book price of the vehicle.

User data 720 is comprised of the data associated with the user 110. The user data 720 includes basic contact information of the user 721, including the user's name, address, telephone number(s), fax number, email address, etc. The user data 720 also includes basic demographic data, such as gender 722 and age 723. The user data 720 also includes data that can be used to analyze the user's finances and financial responsibility, such as social security number 724 and employment information 725. The user data 720 also includes the user's driver's license number 726, with which the insurance company 108 can retrieve information on the user's driving history.

The user telematics data 720 includes data collected by the data acquisition program. The user telematic data includes sensed data about the user's health and overall condition such as, blood pressure, body temperature, body mass index, blood glucose level, blood alcohol content, brain function, activity level, respiratory rate, eye dilatation, etc. Additionally, or alternatively the user telematic data 720 includes sensed data about the user's environment. Such data includes, but is not limited to, oxygen content, carbon monoxide level, methane gas detection, hydrogen sulfide gas presence, etc. The user telematic data 720 is generally a measure of any health/environmental factor the user is experiencing during or around vehicle operation.

The vehicle telematics data 730 includes data collected by the data acquisition program. The telematics data 730 includes GNSS data 731 and accelerometer data 732 collected by the GNSS receivers 312 or 412 and accelerometers 314 or 414, respectively. The telematics data also includes data collected from the OBD port, such as seatbelt usage data 733, airbag deployment data 734, and vehicle diagnostics data 735. The telematics data 730, particularly the GNSS data 731, accelerometer data 732, and any data received from the vehicle computer relating to driving behavior (e.g., odometer data, RPM data, etc.) are processed to generate metrics indicative of driving behavior. For example, the telematics data 730 can be processed to generate a speed rating or speed summary information 740, which can include a top speed, an average speed, a rating of the speed relative to the types of roads that were driven on, and/or any other result of analyzing speeds experience by the vehicle. The telematics data 730 can be similarly processed to generate a vehicle handling rating or summary 742, which, in addition to speed, may also take acceleration and jerk into account, as well as road type and any other pertinent factors. The time of day of trips 744, distances of trips 746, and locations of trips 748 can also be analyzed for use in setting an insurance price. For example, the insurance system may determine that a driver who drives mainly at night and in rural areas receives a different rate quote than a driver who drives mainly during the daytime in urban areas.

The vehicle telematics data 730 is also analyzed to determine whether the vehicle is malfunctioning or needs service (decisions 750 and 752). The vehicle diagnostics data 735, the airbag data 734, and data indicating the distance traveled are particularly relevant for these determinations. If the vehicle is malfunctioning or should be serviced, an alert (754 or 756) is generated and communicated to the user's telephone, smart phone, computer, or any other communications device, or to the vehicle 102. The alert can be in the form of a phone call, a voice mail, a text message, an email, an alert on the vehicle's dashboard, or any other type of communication. The alert can include the type of service needed or a description of the malfunction, a level of urgency of receiving the service or correcting the malfunction, and an estimated cost for receiving the service or correcting the malfunction. From the service history record 760, the insurance system 108 can identify whether the user 110 is keeping his car in good condition.

In some embodiments, there may be telematics data 762 from previous telematics monitoring that was performed by the same insurance company, a different insurance company, or not associated with an insurance company. The previous telematics data 762 may be similar to the telematics data 730. If the insurance system 108 can access the previous telematics data 762, it can use this to generate an insurance quote without collecting telematics data 730. In this case, a quote can be generated as soon as the previous telematics data 762 is available to the insurance system 108. In other embodiments, telematics data 730 is still gathered, and it is supplemented by the previous telematics data 762. If the telematics data 762 was collected by a different insurance company or a different vehicle data collection device 104, the format of the data may not be in the format used by the insurance system 108 for calculating an insurance premium. In this case, the insurance system 108 can convert the data format into the data format output by the insurance company's data acquisition program.

In some embodiments, data from a third-party data provider 764 is also accessed for generating the insurance quote. For example, data from a third-party data provider 132 may provide additional information related to the user, such as the user's driving record or credit history. Other third-party data, such as traffic and weather data, is processed in conjunction with the received telematics data to evaluate driving patterns in view of the road conditions and may be used when evaluating the user's driving speed and vehicle handling.

If the user 110 already has an insurance plan, the user 110 may provide current user insurance data 770 related to his current insurance plan. The user 110 can provide a summary of coverages provided 771, the premium price of the plan 772, and the deductible price of the plan 773, which the insurance company can use to determine a competitive quote. The user 110 can also provide the renewal date 774. Before the renewal date 774, the insurance company can provide reminders or advertisements the user 110 to remind him of his rate and promotions. The user current insurance data 770 also can include information on any claims filed on the insurance plan 775, which can be used to supplement the user's driving record and to evaluate the insurance risk of the user 110.

Based on some or all of the vehicle data 710, user data 720, user current insurance data 770, vehicle telematics data 730, processed driving behavior characteristics 740-748, service history 760, previous telematics data 762, and third-party data 764, the insurance system 108 or an underwriter determines a premium price or set of premium prices based on coverage for the driver. Safe driving behaviors, user health factors within tolerance, user environmental factors within tolerance, low mileage, seatbelt usage, good vehicle conditions, good attention to service needs, and good financial history may be associated with lower insurance premiums. The various factors may be rated separately, e.g., an overall safety rating can be calculated, or a driving behavior rating can be calculated. The factors can be weighted, and the premium price based on the various rating factors and their relative weights. In some embodiments, the insurance system 108 or an underwriter uses the vehicle telematics data 730 in an algorithm for generating an insurance quote. In other embodiments, the insurance system 108 or an underwriter uses the vehicle telematics data 730 to calculate a discount to apply to an insurance quote that is determined by the insurance system 108 or an underwriter without the telematics data 130. In some embodiments, some of the data, particularly the telematics data, is used to determine whether an eligibility requirement is satisfied. For example, if the telematics data shows that the user's driving behaviors or health issues are too unsafe, the insurance company may decide not to offer insurance to the user 110. If the telematics data meets the eligibility requirement, the telematics data may or may not be used further in calculating the insurance quote 780.

In some embodiments, the insurance quote 780 is not based on the telematics data but merely the fact that telematics data is being collected. For example, the insurance company can give the user 110 a discount on an insurance premium if the insurance company knows that telematics data is being collected, but the insurance company may not use the telematics data itself for pricing the insurance plan. The providing of an incentive can be similarly based on whether or not telematics data is being collected. In some embodiments, the insurance quote 780 and/or the incentive is based on the frequency or duration of the telematics data collection. Alternatively, the incentive or discount can be based on the frequency or duration with which the user 110 runs the telematics data acquisition program.

An aspect of the disclosure includes a system for processing environmental safety status, health data, and vehicle data related to determination of an insurance quote for a user. The system comprising a communications interface configured to receive user health telematics data collected by a telematics data acquisition device. The telematics data acquisition device is configured to collect user health telematic data of a user safety status. The user health telematic data being indicative of the user safety status while operating a vehicle. The system is configured to receive vehicle telematic data collected by a telematics data acquisition device. The telematics data acquisition device is configured to collect telematics data of a vehicle. The telematics data is indicative of the safety of the vehicle while being operated by a user. The system is configured to provide the health telematic and the vehicle telematic data to a business logic processor for the development of an insurance quote based on at least one of the received health telematics data or vehicle telematic data. The system is configured to transmit the insurance quote to the user.

A further aspect includes the insurance quote system disclosed includes the user health telematics data collected by a telematics data acquisition device. The data contains telematic data that is at least one of a body mass index, blood pressure, respiratory rate, heart rate, perspiration, body temperature, physical activity rate, eye dilation, blood sugar level, brain function (EEG), vacillations in blood sugar level, hours of sleep, physical activity rate and duration, water consumption, food consumption, alcohol consumption, amount of sunlight exposure, and/or exposure to any variety of air or water pollutants data.

A further aspect includes the insurance quote system wherein health telematics data indicates an unsafe condition for the user.

Yet another aspect includes an insurance quote system wherein the telematics data indicative of safety of the vehicle includes telematic data that is at least one of a vehicle speed, vehicle handling, driving times, distance traveled, location of the vehicle, and condition of the vehicle.

A further aspect includes an insurance quote system wherein vehicle telematics data indicates an unsafe condition for the user.

Another aspect includes an insurance quote system further comprising transmitting the insurance quote to an insurance agent or insurance company.

A still further aspect includes one or more tangible computer readable media storing computer readable instructions that, when executed, perform a method of providing a insurance quote to a user based upon human health telematic data and vehicle telematic data. Including receiving health telematic data via a communications interface health telematics data collected by a telematics data acquisition device. Also, receiving vehicle telematic data via a communications interface vehicle telematics data collected by a telematics data acquisition device. This includes determining an insurance quote based on the received health telematic data and the received vehicle telematic data. Also included is transmitting the insurance quote to the user.

The computer readable media includes the step of receiving health telematic data about at least one of a body mass index, blood pressure, respiratory rate, heart rate, perspiration, body temperature, physical activity rate, eye dilation, blood sugar level, brain function (EEG), vacillations in blood sugar level, hours of sleep, physical activity rate and duration, water consumption, food consumption, alcohol consumption, amount of sunlight exposure, and/or exposure to any variety of air or water pollutants data.

Also included is the computer readable media wherein the health telematic data indicates the user is in an unsafe condition.

Additionally, included is the computer readable media wherein the step of receiving vehicle telematic data includes receiving vehicle telematic data of at least one of a vehicle speed, vehicle handling, driving times, distance traveled, location of the vehicle, and condition of the vehicle.

The computer readable media wherein the vehicle telematic data indicates the user is in or near an unsafe environment or location.

Also included is the computer readable media wherein the step of transmitting the insurance quote to the user includes transmitting the insurance quote based upon an unsafe condition detected with the user's health.

Further, the computer readable media wherein the unsafe condition detected with the user's health is related to user telematic data. This includes data about at least one of a body mass index, blood pressure, respiratory rate, heart rate, perspiration, body temperature, physical activity rate, eye dilation, blood sugar level, brain function (EEG), vacillations in blood sugar level, hours of sleep, physical activity rate and duration, water consumption, food consumption, alcohol consumption, amount of sunlight exposure, and/or exposure to any variety of air or water pollutants data.

An additional aspect includes the computer readable media wherein the step of transmitting the insurance quote to the user includes transmitting the insurance quote based upon an unsafe condition detected with environmental conditions in the user's location.

Also includes is the computer readable media wherein the vehicle conditions include at least one of a vehicle speed, vehicle handling, driving times, distance traveled, location of the vehicle, and condition of the vehicle.

Yet another non-limiting aspect of this disclosure includes a sensor system that has a first sensor, to be worn by a user. The first sensor outputting a first sensor data indicative of measured at least one user health telematic data. Additionally, included is a second sensor, in communication with a vehicle being operated by the user, the second sensor outputting a second sensor data indicative of a measured at least one vehicle telematic data. Also included, a computing unit, in communication with the first sensor and the second sensor. The computing unit storing program instructions for execution by the computing unit to receive the first sensor data and the second sensor data, calculate a risk level associated with the first sensor data and the second sensor data, and output a insurance quote feedback signal to the user indicative of the risk level of the first sensor data and the second sensor data.

Also included is a sensor system wherein the first sensor data is user telematic data about at least one of a body mass index, blood pressure, respiratory rate, heart rate, perspiration, body temperature, physical activity rate, eye dilation, blood sugar level, brain function (EEG), vacillations in blood sugar level, hours of sleep, physical activity rate and duration, water consumption, food consumption, alcohol consumption, amount of sunlight exposure, and/or exposure to any variety of air or water pollutants data.

Also included is a sensor system wherein the output signal to the user is an insurance quote indicative of the user telematic data indicating the user spending excessive time in an area having a predetermined dangerous or unsafe level or condition.

Another aspect includes a sensor system further including providing an insurance quote output feedback signal to an insurance company or insurance agent.

Yet another aspect includes a sensor system wherein the second sensor data is data related to at least one of a vehicle speed, vehicle handling, driving times, distance traveled, location of the vehicle, and condition of the vehicle.

Also, a sensor system further includes providing an insurance quote output feedback signal to an insurance company or an insurance agent.

Another aspect of the disclosure is a method for providing an insurance quote based upon human health telematic data and vehicle telematic data. The method comprising receiving, by a communications interface, user health telematics data collected by a telematics data acquisition device; the user health telematics data being indicative of a user health status health while operating a vehicle. Also, receiving, by a communications interface, vehicle telematic data collected by a telematics data acquisition device, the vehicle telematics data being indicative of a vehicle safety status health while being operated by a user. Further, determining, by the business logic processor, an insurance quote for the user based on the received user health telematic data and vehicle telematic data. Additionally, providing by the business logic processor the insurance quote to the communications interface. Also, transmitting, by the communications interface, the insurance quote to the user.

The method further comprising transmitting, by the communications interface, the insurance quote to an insurance company or an insurance agent.

A further aspect of the disclosure is a method of providing human telematic based insurance quote to a user based upon human telematic data and vehicle telematic data. The additional aspect comprising providing a first sensor, to be worn by a user, a first sensor data indicative of measured at least one user health telematic data. Also, providing a second sensor, in communication with a vehicle being operated by the user, the second sensor outputting a second sensor data indicative of a measured at least one vehicle telematic data. This aspect also includes providing a computing unit, in communication with the first sensor and the second sensor, the computing unit storing program instructions for execution by the computing unit. The computing unit receiving the first sensor data and the second sensor data and calculating a risk level associated with the first sensor data and the second sensor data. The computing unit is also providing an insurance quote output feedback signal indicative of the risk level of first sensor data and the second sensor data to the user.

The method further comprising transmitting, by the communications interface, the insurance quote to an insurance company or an insurance agent.

An additional aspect includes a method wherein the user health telematic data is user telematic data about at least one of a body mass index, blood pressure, respiratory rate, heart rate, perspiration, body temperature, physical activity rate, eye dilation, blood sugar level, brain function (EEG), vacillations in blood sugar level, hours of sleep, physical activity rate and duration, water consumption, food consumption, alcohol consumption, amount of sunlight exposure, and/or exposure to any variety of air or water pollutants data.

Yet another aspect includes a method wherein the vehicle telematic data include at least one of a vehicle speed, vehicle handling, driving times, distance traveled, location of the vehicle, and condition of the vehicle.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for processing vehicle operator status data, and historic vehicle data and user environmental data related to determination of an insurance quote comprising:
    providing a non-transitory computer-readable storage medium with instructions stored thereon that, when executed, direct a processor to perform acts comprising:
        accessing user health telematic data via a telematics data acquisition device having at least one telematic sensor in direct physical contact with a user, the user health telematic data being indicative of the user's health status while operating a vehicle;
        accessing a historic vehicle telematic data via a telematics data acquisition device in communication with a vehicle operating status, the historic vehicle telematic being indicative at least one historical attribute of the vehicle;
        accessing user environmental data collected by an environmental telematics data acquisition device worn by the user, wherein the environmental telematics data is indicative of a measured at least one user environmental data;
        calculating an insurance quote based on the sensed user health telematic data, historic vehicle telematic data, and user environmental data; and,
        transmitting the insurance quote to the user via a mobile device for immediate acceptance of the insurance quote.

2. The method of claim 1, wherein accessing user health telematic data includes receiving data about at least one of a body mass index, blood pressure, respiratory rate, heart rate, perspiration, body temperature, physical activity rate, blood sugar level, brain function (EEG), vacillations in blood sugar level, hours of sleep, physical activity rate and duration, water consumption, food consumption, alcohol consumption, amount of sunlight exposure, and/or exposure to any variety of air or water pollutants data.

3. The method of claim 1, wherein the user health telematic data indicates the user is in an unsafe condition.

4. The method of claim 1, wherein accessing historic vehicle telematic data includes receiving historic vehicle telematic data of at least one of a vehicle purchase price, vehicle accident history, vehicle malfunction history, vehicle maintenance history, location of vehicle use, distance traveled, and/or condition of the vehicle.

5. The method of claim 4, wherein the historic vehicle telematic data indicates the user is in or near an unsafe environment or location.

6. The method of claim 1, wherein the user environmental data indicates the user is in an unsafe environmental area.

7. The method of claim 1, further comprising transmitting the insurance quote to an insurance company or insurance agent.

8. The method of claim 1, wherein acceptance of the insurance quote by the user yields a binding insurance policy.

9. The method of claim 8, wherein the binding insurance policy covers either personal or real property.

10. The method of claim 1, wherein the insurance quote is either an increase or decrease of an existing insurance policy.

11. The method of claim 1, wherein the insurance quote is a new insurance policy.

12. The method of claim 1, further comprising accessing current vehicle telematic data wherein the current vehicle telematic data is indicative of at least one current vehicle telematic attribute of the vehicle.

13. The method of 12, wherein the current vehicle telematic data is at least one of a vehicle speed, vehicle location, vehicle drive time, and/or vehicle condition.

14. A system for determining an insurance quote comprising:
a non-transitory computer-readable storage medium with instructions stored thereon that, when executed, direct a processor to perform acts, comprising:
access user health telematic data via a telematics data acquisition device having at least one telematic sensor in direct physical contact with a user, the user health telematic data being indicative of the user's health status while operating a vehicle;
access historic vehicle telematic data via a telematics data acquisition device in communication with a vehicle operating status, the historic vehicle telematic data being indicative of at least one historical attribute of the vehicle;
access user environmental telematics data collected by an environmental telematics data acquisition device worn by the user, wherein the user environmental telematics data is indicative of at least some user environmental data;
calculate an insurance quote based on the sensed user health telematic data, historic vehicle telematic data, and user environmental data; and,
transmit the insurance quote to the user via a mobile device for immediate acceptance of the insurance quote.

15. The system of claim 14, wherein the insurance quote is transmitted to an insurance company or insurance agent.

16. The system of claim 15, wherein the insurance quote is based upon the health telematic data or the vehicle telematic data, further wherein the insurance quote indicates the user is spending an excessive time in a potentially dangerous situation.

17. A non-transitory computer-readable storage medium with instructions stored thereon that, when executed, direct a processor to perform acts comprising:
accessing user health telematic data indicative of a user's current health status while within a vehicle, wherein the user health telematic data is collected substantially continuously;
accessing user environmental telematic data indicative of an environmental quality around the user;
accessing historic vehicle telematic data indicative of the historical nature of prior vehicle use;
calculating a risk level associated with the user health telematic data, user environmental telematic data, and the historic vehicle telematic data;
calculating an insurance quote indicative of the risk level based upon the calculated risk level, and;
transmitting the insurance quote to the user via a mobile device for immediate acceptance of the insurance quote.

18. The non-transitory computer-readable storage medium of claim 17, further comprising transmitting the insurance quote to an insurance company or insurance agent.

19. The non-transitory computer-readable storage medium of claim 17, wherein the user health telematic data is data about at least one of a body mass index, blood pressure, respiratory rate, heart rate, perspiration, body temperature, physical activity rate, eye dilation, blood sugar level, brain function (EEG), vacillations in blood sugar level, hours of sleep, physical activity rate and duration, water consumption, food consumption, alcohol consumption, amount of sunlight exposure, and/or exposure to any variety of air or water pollutants data.

20. The non-transitory computer-readable storage medium of claim 17, wherein the historic vehicle telematic data includes at least one of a vehicle speed, vehicle handling, driving times, distance traveled, location of the vehicle, and condition of the vehicle.

* * * * *